(12) United States Patent
Isfort

(10) Patent No.: US 9,055,715 B2
(45) Date of Patent: Jun. 16, 2015

(54) SELF-PROPELLED FORAGE HARVESTER

(71) Applicant: CLAAS SELBSTFAHRENDE ERNTEMASCHINEN GMBH, Harsewinkel (DE)

(72) Inventor: Heinrich Isfort, Duelmen (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 10 days.

(21) Appl. No.: 14/072,021

(22) Filed: Nov. 5, 2013

(65) Prior Publication Data

US 2014/0157743 A1  Jun. 12, 2014

(30) Foreign Application Priority Data

Dec. 12, 2012 (DE) .......................... 10 2012 112 156

(51) Int. Cl.
| | | |
|---|---|---|
| *A01F 12/40* | (2006.01) |
| *A01D 61/00* | (2006.01) |
| *A01F 29/00* | (2006.01) |
| *A01D 75/18* | (2006.01) |
| *A01D 41/12* | (2006.01) |
| *A01D 43/08* | (2006.01) |
| *A01D 75/20* | (2006.01) |

(52) U.S. Cl.
CPC ............... *A01D 61/00* (2013.01); *A01F 29/00* (2013.01); *A01D 75/187* (2013.01); *A01D 41/1261* (2013.01); *A01D 43/088* (2013.01); *A01D 75/20* (2013.01)

(58) Field of Classification Search
CPC .............. A01D 41/1243; A01D 41/12; A01D 41/1261; A01D 43/088; A01D 75/20; A01D 75/187; B62D 25/00; B62D 25/10; B62D 25/168; B62D 25/188; E02F 1/1075; E02F 1/1091; E05C 17/14; E05Y 2201/21; E05Y 2201/256; E05Y 2900/536; E05Y 2900/516; E05Y 2900/50
USPC ........... 56/10.1, 16.6, 17.5; 460/80, 100, 106, 460/111, 112; 180/69.24, 69.2, 100.09, 180/89.7, 89.17, 69.21, 89.12; 292/103, 87, 292/336.3; 16/289, 357, 358, 361; 55/290, 55/460, 294, 385.3, 493; 296/193.11, 108; 182/84, 127; 280/166
See application file for complete search history.

(56) References Cited

U.S. PATENT DOCUMENTS 4,131,172 A * 12/1978 Wolfgram .................. 180/69.24
4,415,052 A * 11/1983 Gauer ........................... 180/69.2
(Continued)

FOREIGN PATENT DOCUMENTS

| DE | 197 42 846 | 4/1999 |
| DE | 100 63 555 | 7/2002 |

*Primary Examiner* — Robert Pezzuto
(74) *Attorney, Agent, or Firm* — Michael J. Striker

(57) ABSTRACT

A self-propelled forage harvester includes a main frame with frame parts, a preparation and conveyor device with a chopping assembly, a post-chopping device and a conveying device, a tower connected to an upper discharge chute, a heat exchanger, an engine, lateral covering elements enclosing an engine compartment and a compartment partially enclosing the preparation and conveyor device. The covering elements extend from a rear region to a region adjacent to a driver's cab, are guided at a bow-shaped supporting element connected to the main frame such that the covering element is pivotable about a horizontally extending pivot axis provided at the upper edge or horizontal leg of the supporting element and, about a substantially vertically extending pivot axis provided at one end of the horizontal leg.

7 Claims, 2 Drawing Sheets

(56) References Cited

U.S. PATENT DOCUMENTS

| | | | |
|---|---|---|---|
| 4,542,785 A * | 9/1985 | Bagnall et al. | 165/95 |
| 4,906,262 A * | 3/1990 | Nelson et al. | 55/290 |
| 5,634,525 A * | 6/1997 | Templeton et al. | 180/69.24 |
| 5,984,037 A * | 11/1999 | Duhem | 180/89.17 |
| 6,029,430 A | 2/2000 | Isfort et al. | |
| 6,468,153 B2 * | 10/2002 | Sheidler et al. | 460/100 |
| 6,659,859 B2 | 12/2003 | Nieschulze | |
| 7,604,077 B2 * | 10/2009 | Renard | 180/69.2 |

* cited by examiner

SELF-PROPELLED FORAGE HARVESTER

CROSS-REFERENCE TO A RELATED APPLICATION

The invention described and claimed hereinbelow is also described in German Priority Document DE 10 2012 112 156.7, filed on Dec. 12, 2012. The German Priority Document, the subject matter of which is incorporated herein by reference, provides the basis for a claim of priority of invention under 35 U.S.C. 119(a)-(d).

BACKGROUND OF THE INVENTION

The invention relates to a self-propelled forage harvester comprising a main frame with frame parts extending on both sides of the forage harvester, in the longitudinal direction thereof, and a chopping assembly having, downstream thereof, a preparation and conveyor device, substantially comprising a post-chopping device, a discharge accelerator, and a tower connected to an upper discharge chute, a heat exchanger and an internal combustion engine, and comprising lateral covering elements, which close, to the outside, an engine compartment accommodating the internal combustion engine and the heat exchanger, and a compartment partially accommodating the preparation and conveyor device.

A self-propelled forage harvester is an agricultural harvesting machine, by means of which a stalk crop or corn is picked up via a front attachment, is then fed to a preparation device comprising compression rollers, a chopping assembly and post-chopping devices, and, finally, is fed via a discharge accelerator and a swivellable upper discharge chute to a collecting vehicle. An adjustable flap disposed at the end of the upper discharge chute is used to direct the crop emerging therefrom such that this crop reaches the collecting vehicle and such that this collecting vehicle is completely filled.

A self-propelled forage harvester of the type set forth in the preamble of claim 1 is known from DE 197 42 846 A1. This is a self-propelled forage harvester, in the case of which the crop that is cut and picked up by a front harvesting attachment reaches a chopping assembly and, from there, reaches a conditioning device for preparation. From there, the prepared crop is fed to a post-accelerator, which conveys this prepared crop via an upper discharge chute to a hauling vehicle. Adjoining the post-accelerator is a conveyor chute, which is enclosed by a conveyor tower, wherein the conveyor tower, the post-accelerator, and the post-chopping device are disposed in a region behind a driver's cab and in front of the heat exchanger, which is referred to as the maintenance compartment. The engine compartment and the maintenance compartment are closed to the outside on both sides by means of vertically extending covering elements. One of these covering elements comprises a flap, which obviously can be opened for maintenance work.

Furthermore, document DE 100 63 555 B4 discloses a protective guard for a self-propelled forage harvester, which comprises a service opening above feed rollers of the chopping assembly, wherein this service opening can be covered by a protective guard. The protective guard, which should comprise a flexible material, can be equipped with a service flap.

SUMMARY OF THE INVENTION

The present invention overcomes the shortcomings of known arts, such as those mentioned above.

To that end, the present invention provides a lateral covering of a self-propelled forage harvester such that maintenance work or repair work that may be required is simplified.

In an embodiment, the forest harvester includes at least one of the covering elements, which extends from a rear region of the self-propelled foraging harvester to a region adjacent to a driver's cab, is guided on a bow-shaped supporting element connected to the main frame such that the covering element that is swivellable about a horizontally extending pivot axis provided on the upper edge thereof and about a substantially vertically extending pivot axis provided on one end thereof.

The forage harvester is connected, in the front region thereof, to a front harvesting attachment in the form of a header table, a corn header, or a pick-up.

Furthermore, the forage harvester comprises devices for chopping, preparing and conveying the crop. A driver's cab is disposed above the front harvesting attachment or the devices for chopping and preparing the crop. The feed rollers draw the crop into the harvesting machine and compress this crop stream. The crop stream is further compressed by means of compression rollers, which adjoin the feed rollers and which are driven in pairs, as are the feed rollers.

The compressed crop stream then reaches a chopper drum, which is equipped with knives and interacts with stationary shear bars. If maintenance or repair work must be performed on the aforementioned assemblies of the device for preparing and chopping the crop, this takes place from the front side or from a region located behind the drive wheels of the forage harvester.

Adjoining the chopper drum in the direction of the crop flow is a post-chopping device, which is also referred to as a corn cracker. In the case of harvesting corn for silage or corn for a biogas plant, this post-chopping device is used to crack or fragment the corn kernels such that the corn kernels can be incorporated into the subsequent fermentation process. Finally, a discharge accelerator drum, which is a component of the conveyor device, conveys the chopped crop into a conveyor chute formed by a tower. An adjustable upper discharge chute extends therefrom.

In order to perform maintenance or repair work on the post-treatment device and/or the discharge accelerator drum or the internal combustion engine, or to replace these entirely, the person performing this work must be able to access the assemblies located behind the driver's cab with the fewest possible obstructions.

According to the invention, the lateral covering elements of the self-propelled forage harvester provided in the region of these assemblies are swivellable about a horizontally extending pivot axis provided on the upper edge. The corresponding covering element can be moved, by being swivelled upwardly, into an opening position, which is adequate therefor, and can be locked in this opening position, in order to permit minor repair work and maintenance work to be performed. However, if repair or replacement work must be performed, then, according to the invention, the entire covering element is swivelled about a vertically extending pivot axis so that this work is unobstructed.

By contrast, according to German Patent document DE 197 42 846 A1, covering elements are provided that are mounted in fixed positions on the frame parts of the main frame. The only way to access a maintenance compartment located between the post-accelerator and the heat exchanger is via a flap, which is vertically hinge-mounted on one of the covering elements. Therefore, it is not possible to perform repair, replacement or maintenance work on the assemblies located behind the covering elements without obstruction. The protective guard presented in DE 100 63 555 B4 is located in the intake region of the forage harvester and has a flap, which can swivel in only one plane.

The invention also provides a vertically extending upright at a rear end of the forage harvester on at least one of the frame parts, on which a first swivel bearing is provided for swivelling the at least one covering element about the vertically extending pivot axis. The upright can be fastened on a frame party by means of a flange. In an embodiment, if covering elements formed on both longitudinal sides of the self-propelled forage harvester are intended to provide access to the engine compartment and as the compartment includes the preparation and conveyor device, then similar uprights are provided at both rear corners of the forage harvester.

In addition, when two uprights are used, the posts are connected to one another via a transversely extending section such that, overall, a bridge-like element is formed. In this case, the bridge-like or bow-shaped element is fastened on a bumper guard extending between the two frame parts, and can accommodate a rear cover.

Further, a connecting brace is provided on a heat exchanger, in the region of the upper extension thereof, wherein another end of this connecting brace is connected to the upright. A component is therefore provided, in the form of the connecting brace, which ensures adequate support of the heat exchanger, but which can be easily removed so that repair or replacement work can be performed.

In addition, a substantially vertically extending leg of the bow-shaped supporting element is guided on the first swivel bearing and transitions into a horizontally extending leg, on which the covering element is guided via second swivel bearings, about which the covering element can swivel relative to the horizontally extending leg. The two legs preferably extend at a right angle to one another. The angle is preferably less than 90° so the covering element has a slanted position in the swivelled-open state. The horizontally extending leg, at the least, can be designed as a tube, wherein the covering element is swivellably guided on this tube via straps provided with bore holes. The swivel bearing disposed between the particular upright and the vertically extending leg is similarly designed. This leg also is preferably a tube, wherein the tube is rotatably guided in preferably two receptacles provided at the upright. The overall result is a rotating-tilting guidance of the particular covering element, which can be produced using low-cost means.

Further, a gas strut can be detachably connected to the covering element. This gas strut supports the covering element, in the opened position thereof, with respect to the frame part. The gas strut must be removed before the covering element can be swivelled upwardly about the vertically extending swivel bearing thereof.

Finally, a removable roof brace is disposed between a hood (which covers the engine compartment on the top), and a cab of the self-propelled forage harvester. The roof brace, together with the hood, forms a stop for the covering element in the upper edge region thereof. This roof brace, at the ends thereof, is designed such that these ends engage in a form-locked manner in receiving openings on the back side of the driver's cab and at elements that extend from the heat exchanger. This roof brace can therefore be easily removed and then no longer poses a hindrance to disassembly and assembly work performed on the tower and on the post-chopping device.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives failing within the spirit and scope of the present invention, as defined by the appended claims.

Figure 1:
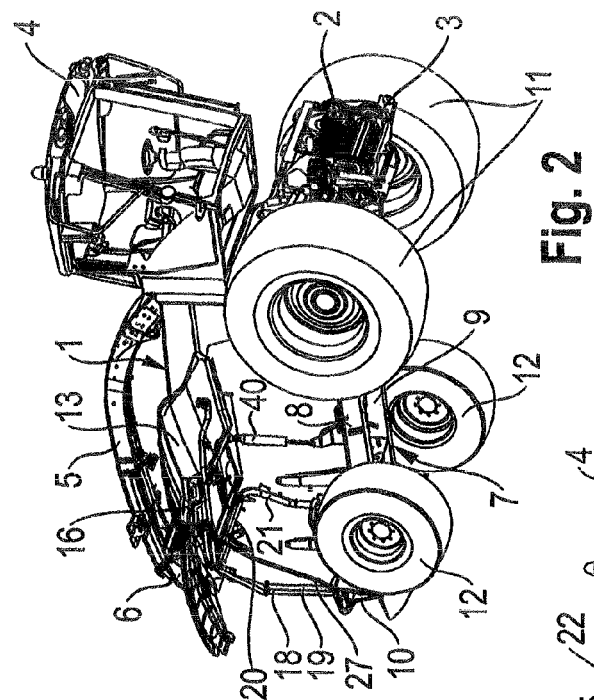
FIG. 1 presents a side view of a harvesting machine designed as a self-propelled forage harvester without a front harvesting attachment and with a closed covering element.
Figure 2:
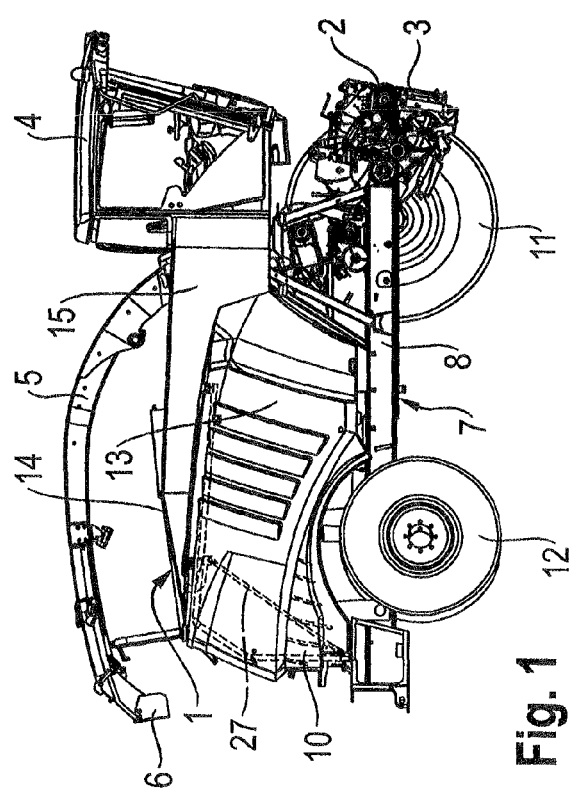
FIG. 2 presents a perspective view of the forage harvester of FIG. 1 where the covering element has been swivelled upwardly about a horizontal pivot axis.
Figure 3:
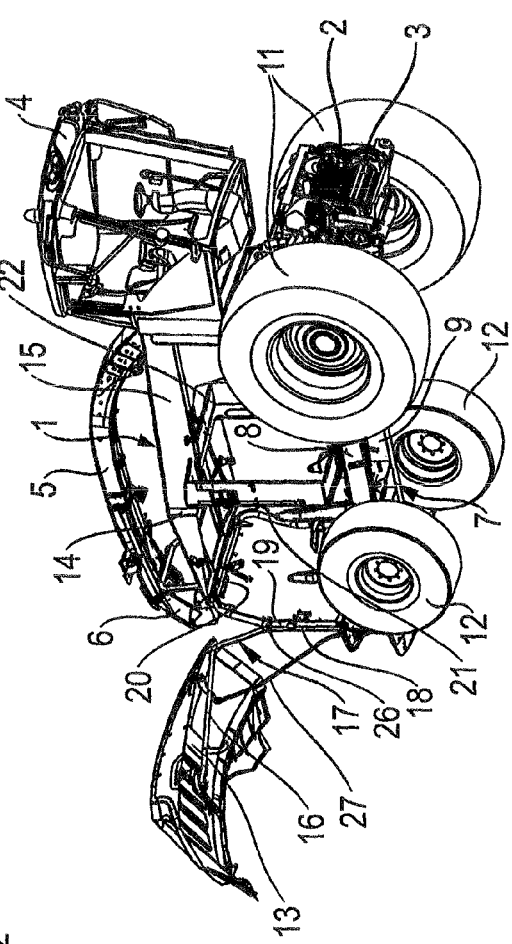
FIG. 3 presents a perspective view of the forage harvester FIG. 1 where the covering element has been swivelled about a vertically extending pivot axis.

A self-propelled forage harvester 1 is depicted in FIGS. 1 to 3, which is designed in the front region thereof to accommodate a front harvesting attachment. Since this front harvesting attachment has been removed, feed rollers 2 and 3 are visible. The feed rollers operate to compress and convey the crop picked up by the front harvesting attachment into the interior of the machine. A driver's cab 4 and a swivellable upper discharge chute 5. The upper discharge chute 5 is swivelled in order to direct the crop in a targeted manner to a non-illustrated collecting vehicle traveling next to the forage harvester 1 in parallel but offset therefrom. A discharge flap 6, which is swivellable about a horizontal axis, is located at the end of the upper discharge chute 5.

The self-propelled forage harvester further comprises a main frame 7 having frame parts 8 and 9, which extend on both sides in the longitudinal direction of the forage harvester 1 and accommodate a transversely extending bumper guard 10 in the rear region of the forage harvester 1. The main frame 7 is supported by means of non-illustrated components of a chassis on driven wheels 11 and non-driven, steerable wheels 12. In addition, the forage harvester 1 comprises covering elements on both sides, of which only the covering element 13 on the right, as viewed in the direction of travel, is visible in FIGS. 1 to 3.

The covering element 13 is shown in FIG. 1 located in the closed position thereof. A roof brace 15 extends above the covering element 13, between the driver's cab 4 and an upper hood 14. According to FIG. 2, the covering element 13 is folded upward about a horizontally extending pivot axis provided at a horizontal leg 16 of a bow-shaped supporting element 17, to permit service work to be performed, for example. In order to ensure that the overall suspension and displacement of the covering element 13 is visible in FIG. 2, the components in the interior of the forage harvester 1 that are required for the operation thereof, and that would need to be maintained, repaired, or replaced, are not shown.

FIG. 2 further shows that the horizontally extending leg 16 transitions into a vertically extending leg 18, which is guided on a first upright 19. This upright 19, which is supported on the frame part 8, is connected via a cross brace 20 to a second upright 21 fastened on the frame part 9. The covering element 13 is supported and, therefore, held, in the folded-open position thereof with respect to the frame part 8 by means of a gas strut 40.

Figure 4:
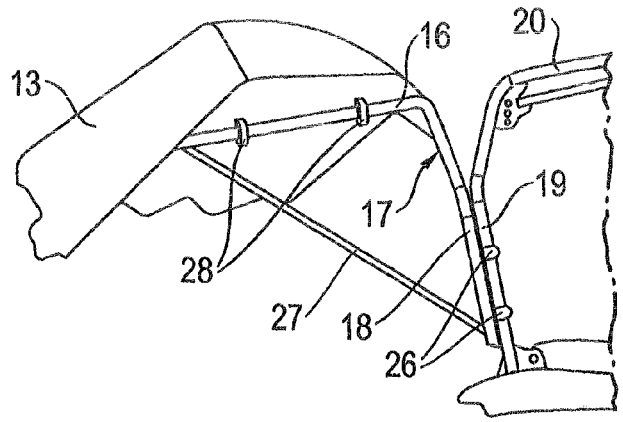
FIG. 4 presents shows an enlarged representation of the position of the covering element shown in FIG. 3.
Figure 5:
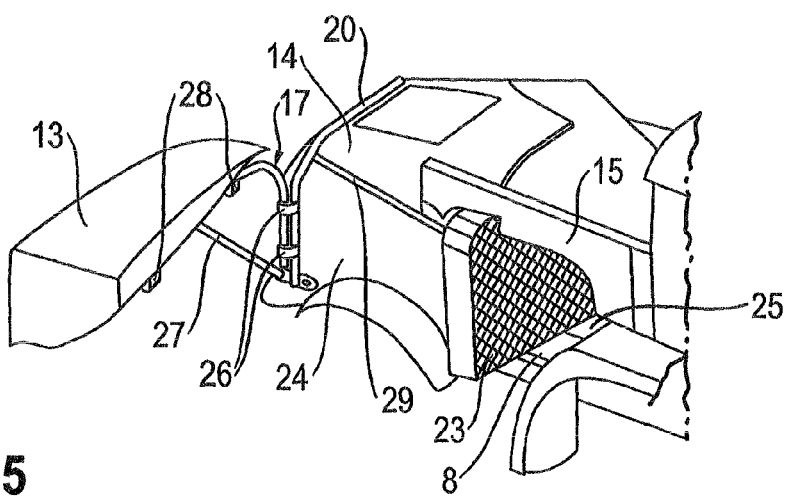
FIG. 5 presents a further partial view of the forage harvester in a region of a roof brace.

FIGS. 3 to 5 show the covering element 13 located in a swivelled-open position in which repair work or a replacement of units or assemblies disposed in the interior of the forage harvester can be performed. FIG. 3 also shows a frame 22, which is used to accommodate or support a heat exchanger 23, which is shown in FIG. 5. An engine compartment 24 is located behind this frame 22, while a compartment 25 for accommodating components of a preparation and conveyor device that extends in front of the frame 22 (FIG. 5). First swivel bearings 26 are provided between the upright 19 and the bow-shaped supporting element 17 to permit the covering element 13 to swivel into this position. Horizontally extending leg 18 is braced with respect to the horizontally extending leg 16 by means of a linkage 27. This arrangement ensures that the covering element is adequately stabilized in the swivelled-up position thereof. The covering element 13 is guided on the horizontally extending leg 16 via second swivel bearings 28. FIG. 5 also shows a connecting brace 29, which extends between the cross brace 20 and the frame 22 accommodating the heat exchanger 23.

Figure 6:
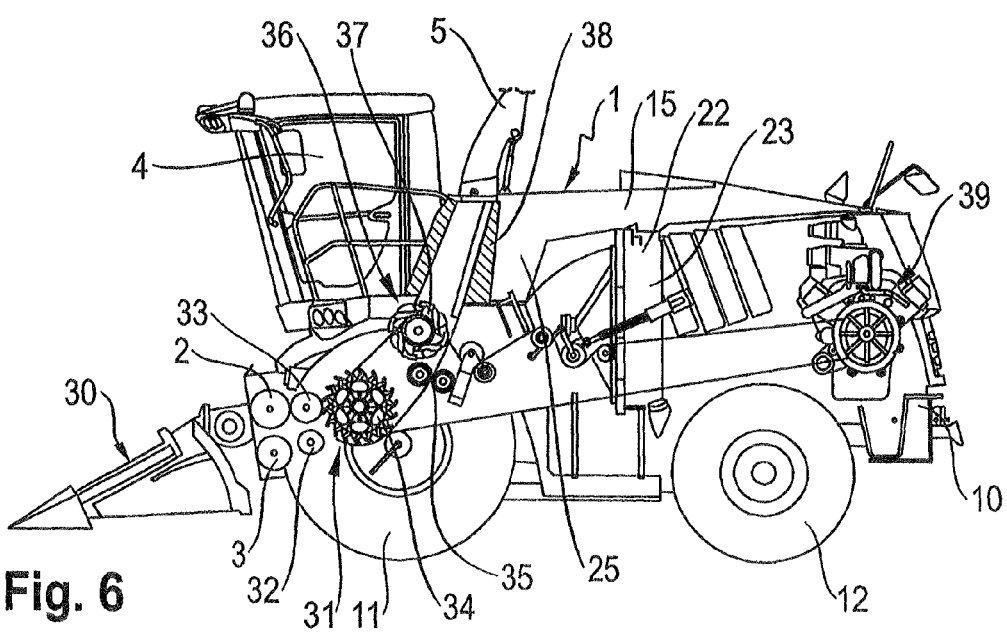
FIG. 6 is a schematic representation of a self-propelled forage harvester comprising a front harvesting attachment, including a partial cross-section in the region of devices for chopping, preparing, and conveying the crop.

FIG. 6 depicts a related forage harvester 1 schematically and partially in a cross section. In contrast to FIG. 1, the forage harvester 1 is shown in FIG. 6 connected to a front harvesting attachment 30 in the form of a header table. Further, the forage harvester 1 comprises a device 31 for preparing and conveying the crop, proximate the upper discharge chute 5 and the driver's cab 4. The driver's cab 4 is disposed above the front harvesting attachment 30 or, partially above the preparing and conveying device 31.

The front harvesting attachment 30 cuts the stalk crop off close to the ground and feeds this to the feed rollers 2 and 3, which are driven in pairs, and between which the crop is guided. The feed rollers 2 and 3 draw the crop into the harvesting machine 1 and compress the crop stream. The crop stream is further compressed by compression rollers 32 and 33, which adjoin the aforementioned feed rollers 2, 3 and also are driven in pairs. The lower compression roller 32 is preferably equipped with a smooth surface and interacts with a stripper, which removes the crop adhering to the smooth surface.

The compressed crop stream then reaches a chopper drum 34, which is equipped with knives and interacts with stationary shear bars to chop the compressed crop. The chopped crop is then fed via (non-illustrated) lateral material guide plates and via a plain concave plate to a post-chopping device 35. In the case of harvesting corn for silage or corn for a biogas plant, this post-chopping device 35 (e.g., a corn cracker), is used to crack and fragmentize the corn kernels such that these fragmented corn kernels can be incorporated into the subsequent fermentation process.

A discharge accelerator 37 is located directly behind the post-chopping device 35, as part of a conveyor device 36. The discharge accelerator 37 transports the chopped crop into a conveyor chute 39 located in a tower 38, wherein the adjustable upper discharge chute 5 adjoins the conveyor chute 39 or the tower 38. The upper discharge chute 5 swivels relative to the tower 38 and comprises an adjustable discharge flap 6 at the end thereof, similar to that described with reference to FIG. 1.

The post-chopping device 35, the discharge accelerator 37 and the tower 38 are disposed in a compartment 25 located behind the driver's cab 4, thereby permitting repair and maintenance work to be performed after the covering element 13 is opened. In order to enable maintenance work to be performed, the covering element 13 is swivelled upwardly about the second horizontally extending swivel bearings 28. However, if repair and replacement work are required, the covering element 13 is swivelled about the first vertically extending swivel bearings. Next, the roof brace 15 is removed to permit free access to the components of the post-chopping device 35, the discharge accelerator and the tower 38, for the repair or removal thereof. The heat exchanger 23 and an internal combustion engine 39, which drives the forage harvester 1, also are accessible thereby.

LIST OF REFERENCE CHARACTERS 1 self-propelled forage harvester
2 upper feed roller
3 lower feed roller
4 driver's cab
5 upper discharge chute
6 discharge flap
7 main frame
8 frame part
9 frame part
10 bumper guard
11 driven wheels
12 steerable wheels
13 covering element
14 hood
15 roof brace
16 horizontally extending leg
17 bow-shaped supporting element
18 vertically extending leg
19 first upright
20 cross brace
21 second upright
22 frame
23 heat exchanger
24 engine compartment
25 compartment
26 first vertical swivel bearing
27 linkage
28 second horizontal swivel bearing
29 connecting brace
30 front harvesting attachment
31 device for preparing and conveying the crop
32 compression roller
33 compression roller
34 chopper drum
35 post-chopping device
36 conveyor device
37 discharge accelerator
38 tower
39 internal combustion engine
40 gas strut As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A self-propelled forage harvester (1) comprising:
a main frame (7) configured with frame parts (9 and 10) extending on both sides of the forage harvester (1) in the longitudinal direction, a preparation and conveyor device (31, 36) comprises a chopping assembly (34), a post-chopping device (35) and a conveying device (36) comprising a discharge accelerator (37), a tower (38) connected to an upper discharge chute (5), a heat exchanger (23), an internal combustion engine (39), lateral covering elements (13) that enclose an engine compartment (24) including the internal combustion engine (39) and the heat exchanger (23) and a compartment (25) partially enclosing the preparation and conveyor device (31, 36);
wherein at least one of the lateral covering elements (13), which extend from a rear region of the self-propelled foraging harvester (1) to a region adjacent to a driver's cab (4), is guided at a bow-shaped supporting element (17) connected to the main frame (7) such that the at least one of the lateral covering elements (13) is pivotable about a horizontally extending pivot axis provided at an upper edge or horizontal leg (16) of the supporting element and, about a substantially vertically extending pivot axis provided at one end of the horizontal leg.

2. The self-propelled forage harvester (1) according to claim 1, wherein a vertically extending first upright (19) is provided at a rear end of the forage harvester (1) on at least one of the frame parts (8, 9) and comprises a first swivel bearing (26) for swivelling the at least one of the lateral covering elements (13) about the vertically extending pivot axis.

3. The self-propelled forage harvester (1) according to claim 1, wherein a connecting brace (29) is positioned in the region of an upper extension of the heat exchanger (23) in order to act on the heat exchanger and wherein another end of the connecting brace is connected to the first upright (19).

4. The self-propelled forage harvester (1) according to claim 2, further including a second upright (21), wherein the first upright (19) and the second upright (21) are dedicated to each of the frame parts (8, 9), respectively, and wherein the first upright (19) and the second upright (21) are connected to one another via a cross brace (20) to form a bridge-like element.

5. The self-propelled forage harvester (1) according to claim 2, wherein a substantially vertically extending leg (18) of the bow-shaped supporting element (17) is guided at the first swivel bearing (26) and transitions into the horizontally extending leg (16), upon which the at least one of the lateral covering elements (13) is guided via second swivel bearings (28), and wherein the at least one of the lateral covering elements (13) swivels relative to the horizontally extending leg (16).

6. The self-propelled forage harvester (1) according to claim 5, further comprising a gas strut (40) is detachably connected to the at least one of the lateral covering elements (13).

7. The self-propelled forage harvester (1) according to claim 5, further comprising a removable roof brace (15) disposed between a hood (14), which covers the engine compartment (24) on a top, and the driver's cab (4) of the self-propelled forage harvester (1), and wherein the roof brace, together with the hood (14), forms a stop for the at least one of the lateral covering elements (13) in an upper edge region.

* * * * *